(12) United States Patent
Tischler et al.

(10) Patent No.: US 12,141,314 B2
(45) Date of Patent: Nov. 12, 2024

(54) SECRET DETECTION ON COMPUTING PLATFORM

(71) Applicant: Google LLC, Mountain View, CA (US)

(72) Inventors: Phillip Marvin Tischler, Mineola, NY (US); Seth Joseph Vargo, Pittsburgh, PA (US); Timothy Dylan Peacock, San Francisco, CA (US); Colin Man, New York, NY (US); Scott Tyler Ellis, San Carlos, CA (US)

(73) Assignee: Google LLC, Mountain View, CA (US)

( * ) Notice: Subject to any disclaimer, the term of this patent is extended or adjusted under 35 U.S.C. 154(b) by 478 days.

(21) Appl. No.: 17/462,939

(22) Filed: Aug. 31, 2021

(65) Prior Publication Data
US 2023/0063214 A1   Mar. 2, 2023

(51) Int. Cl.
G06F 21/62 (2013.01)
G06F 16/22 (2019.01)
G06F 16/2455 (2019.01)
G06F 16/28 (2019.01)
G06F 16/93 (2019.01)

(52) U.S. Cl.
CPC ...... *G06F 21/6227* (2013.01); *G06F 16/2255* (2019.01); *G06F 16/24568* (2019.01); *G06F 16/285* (2019.01); *G06F 16/93* (2019.01)

(58) Field of Classification Search
CPC ............ G06F 21/6227; G06F 16/2255; G06F 16/24568; G06F 16/285; G06F 16/93; G06F 21/6218
See application file for complete search history.

(56) References Cited

U.S. PATENT DOCUMENTS

| | | | |
|---|---|---|---|
| 2002/0021805 A1* | 2/2002 | Schumann | G11B 20/00478 705/51 |
| 2005/0096866 A1* | 5/2005 | Shan | G06F 11/0751 702/179 |
| 2006/0059347 A1* | 3/2006 | Herz | G06T 1/005 713/176 |

(Continued)

FOREIGN PATENT DOCUMENTS

| | | |
|---|---|---|
| CN | 101071462 A | 11/2007 |
| EP | 2287756 A1 | 2/2011 |

OTHER PUBLICATIONS

International Search Report and Written Opinion for International Application No. PCT/US2022/042204 dated Dec. 19, 2022. 14 pages.

(Continued)

*Primary Examiner* — Taghi T Arani
*Assistant Examiner* — Blake I Narramore
(74) *Attorney, Agent, or Firm* — Lerner David LLP

(57) ABSTRACT

Aspects of the disclosure provide for an end-to-end system for detecting and responding to known secrets leaked on a computing platform. By securely retrieving secret data from a repository of known secrets, the platform can detect whether potential secrets are leaked in digital documents generated by applications or services of the platform, and compare the potential secrets with known secrets in the repository. The system deterministically and accurately identifies whether secrets were leaked in a digital document, and can also identify both the source of the leakage and the affected users, devices, or groups of users and devices on the platform.

15 Claims, 5 Drawing Sheets

(56) References Cited

U.S. PATENT DOCUMENTS

| | | | | |
|---|---|---|---|---|
| 2009/0226056 | A1* | 9/2009 | Vlachos | G06T 1/0071 |
| | | | | 382/128 |
| 2010/0241861 | A1* | 9/2010 | Yoshimoto | H04L 61/5014 |
| | | | | 380/278 |
| 2015/0033120 | A1 | 1/2015 | Cooke et al. | |
| 2017/0147656 | A1* | 5/2017 | Choudhary | G06F 16/256 |
| 2017/0310546 | A1* | 10/2017 | Nair | H04W 24/08 |
| 2019/0114191 | A1* | 4/2019 | Lawrence | G06F 17/18 |
| 2020/0089321 | A1* | 3/2020 | Kacelenga | G06F 3/015 |
| 2020/0285997 | A1* | 9/2020 | Bhattacharyya | G06N 7/00 |
| 2021/0383796 | A1* | 12/2021 | Coucke | G10L 15/22 |

OTHER PUBLICATIONS

Moraru and Andersen. Exact Pattern Matching with Feed-Forward Bloom Filters. Sep. 13, 2012. ACM Journal of Experimental Algorithmics, vol. 17, 12 pages. Retrieved from the Internet: <https://www.cs.cmu.edu/~dga/papers/ffbf-alenex2011.pdf>.

Meli et al. How Bad Can It Git? Characterizing Secret Leakage in Public GitHub Repositories. Feb. 24-27, 2019. Network and Distributed Systems Security (NDSS) Symposium 2019. San Diego, CA, USA. 15 pages. Retrieved from the Internet: <https://www.ndss-symposium.org/wp-content/uploads/2019/02/ndss2019_04B-3_Meli_paper.pdf>.

Vargo and Driscoll. Introducing Google Cloud's Secret Manager. Jan. 22, 2020. 5 pages. Retrieved from the Internet: <https://cloud.google.com/blog/products/identity-security/introducing-google-clouds-secret-manager>.

Secret Manager. Google Cloud. 6 pages. Retrieved on Jul. 28, 2021. Retrieved from the Internet: <https://cloud.google.com/secret-manager>.

Cloud Data Loss Prevention. Google Cloud. Retrieved on Jul. 28, 2021. 15 pages. Retrieved from the Internet: <https://cloud.google.com/dlp>.

AWS Secrets Manager Documentation. Amazon Web Services. 1 page. Retrieved on Jul. 28, 2021. Retrieved from the Internet: <https://docs.aws.amazon.com/secretsmanager/index.html>.

AWS Systems Manager Parameter Store. Amazon Web Services. Retrieved on Jul. 28, 2021. 5 pages. Retrieved from the Internet: <https://docs.aws.amazon.com/systems-manager/latest/userguide/systems-manager-parameter-store.html>.

Dowling. git-secrets. GitHub, Amazon Web Services Labs. 2015. 14 pages. Retrieved from the Internet: <https://github.com/awslabs/git-secrets>.

Key Vault. Microsoft Azure. Retrieved on Jul. 28, 2021. 7 pages. Retrieved from the Internet: <https://azure.microsoft.com/en-us/services/key-vault/#product-overview>.

Getting started with Credential Scanner (CredScan). Microsoft Corporation. 2017. 7 pages. Retrieved from the Internet: <https://secdevtools.azurewebsites.net/helpcredscan.html>.

Overview. Secrets Manager. Key Management Service. Alibaba Cloud. Apr. 27, 2021. 6 pages. Retrieved from the Internet: <https://www.alibabacloud.com/help/doc-detail/152001.htm?spm=a2c63.128256.a3.27.156734e4zAa9IH>.

Overview of Vault. Oracle Cloud Infrastructure Documentation. Retrieved on Jul. 28, 2021. 9 pages. Retrieved from the Internet: <https://docs.oracle.com/en-us/iaas/Content/KeyManagement/Concepts/keyoverview.htm>.

Prevent phishing attacks on your users. Google Workspace Admin Help. Retrieved on Jul. 28, 2021. 2 pages. Retrieved from the Internet: <https://support.google.com/a/answer/6197480>.

Meyer. Incremental String Matching. Nov. 18, 1985. Information Processing Letters, vol. 21(5), pp. 219-227. Retrieved from the Internet: <http://se.ethz.ch/~meyer/publications/string/string_matching.pdf>.

Aho-Corasick algorithm. Wikipedia. Nov. 25, 2008. 4 pages. Retrieved from the Internet: <https://en.wikipedia.org/wiki/Aho%E2%80%93Corasick_algorithm>.

Bloom filter. Wikipedia. Jul. 3, 2005. 22 pages. Retrieved from the Internet: <https://en.wikipedia.org/wiki/Bloom_filter>.

Rabin-Karp algorithm. Wikipedia. Nov. 19, 2005. 5 pages. Retrieved from the Internet: <https://en.wikipedia.org/wiki/Rabin%E2%80%93Karp_algorithm>.

\* cited by examiner

SECRET DETECTION ON COMPUTING PLATFORM

BACKGROUND

Secrets are sensitive data, such as cryptographic keys, passwords, and digital certificates. Inadvertently leaked secrets can become a security threat, should a malicious actor discover the leak. Secret leaks commonly occur through human error, such as through software bugs, accidental publications of data logs with secrets in plaintext, mirrored source code in an unprotected location, or through application debugging endpoints left enabled.

Some detection tools use pattern matching techniques, such as regular expressions, or tokenization to identify potential secrets from logs or other digital documents emitted from a computing system. A problem with these approaches is that some secrets, like passwords, are often not subject to a well-known pattern and yield false negative results. Data may inadvertently match a pattern even if the data is not of a secret, resulting in a false positive. Digital documents processed by these detection tools may be unstructured and difficult or impossible to accurately detect using tokenization, for example because token boundaries separated by delimiters do not accurately separate secrets from surrounding data. These approaches are also not suitable for applications at scale, for example for servicing a computing platform with thousands of users, each associated with multiple secrets. One reason these approaches are not suitable at-scale is because additional secrets introduce more potential patterns to be identified, or increase the size of a tokenized dictionary or index. This adds to the time needed for prediction-based detection tools to detect secrets in a body of digital documents. Prediction-based detection systems using Artificial Intelligence are also prone to false positives or false negatives.

BRIEF SUMMARY

Aspects of the disclosure provide for an end-to-end system for detecting and responding to secrets leaked through digital documents, including, but not limited to, logs, emails, source code, network traffic data, files, chat messages and data in various structured and/or unstructured formats, such as blobs. By securely maintaining a repository of known secrets, the platform can detect potential secrets leaks in digital documents emitted by the platform. In this regard, the system may deterministically and accurately identify whether secrets were leaked in a digital document. The system can then compare the contents of the received digital documents with known secrets in the repository to identify any matches between portions of the digital documents with at least one known secret. In the event there is a match, the system can quickly identify both the source of a leak and the affected users or groups of the platform. The system can receive a stream of digital documents as the documents are generated or by accessing the documents from memory after their creation. The system can process digital documents in batches or as a stream, online and/or offline.

Aspects of the disclosure can be performed more efficiently and accurately at-scale than other approaches, such as statistical or probabilistic models for predicting detection of leaked documents, because the system does not rely on making predictions, which are prone to false positives or false negatives. Secret data can be distributed and managed while allowing for efficient distribution of secret detection processes scoped to process secrets associated with various levels of user organization on the platform.

An aspect of the disclosure is directed to a computing platform comprising: one or more computing systems configured to: receive a data stream of one or more digital documents; retrieve a collection of secret data in a repository, the secret data comprising a plurality of secrets, wherein each secret in the plurality of secrets is associated with one or more entities in communication with the one or more computing systems; detect, based on a comparison of the data stream with the secret data, one or more secrets in the data stream; and in response to the detection, send an indication of the presence of the detected secrets to the one or more entities associated with the detected secrets.

Other aspects of the disclosure include corresponding computer systems, computer-implemented methods and computer programs recorded on computer-readable storage media.

The foregoing and other aspects of the disclosure can include one or more of the following features, alone or in combination. In some examples, one aspect includes all of the following features in combination.

In retrieving the collection of secret data in the repository the one or more computing systems can be configured to receive and update the repository with additional secrets received by one or more computing devices associated with the one or more entities.

The data stream and the plurality of secrets can be encoded as strings; and wherein in detecting the presence of the one or more secrets, the computing system one or more computing systems can be further configured to: index the plurality of secrets in the repository, identify one or more potential secrets in the data stream, and identify the one or more secrets from the one or more potential secrets in the data stream.

In indexing the secret data, the one or more computing systems can be further configured to generate one or more filters, the one or more filters indicating the existence or absence of secrets in the secret data with non-zero probability; and wherein in detecting the presence of the one or more secrets in the data stream, the one or more computing systems can be configured to: generate hash values for each substring of a minimum predetermined length in the data stream; query the hash values through the one or more filters to identify potential secrets in the repository with non-zero probability to generate a filtered data stream; and process the potential secrets through one or more search data structures comprising secrets in the repository to detect the presence of the one or more secrets in the data stream.

In indexing the secret data, the one or more computing systems can be configured to generate a respective hash value of a prefix of each secret in the secret data, the length of the prefix equal to the minimum predetermined length; and wherein in querying the hash values through the one or more filters to identify the potential secrets, the one or more computing systems can be configured to, in response to identifying a potential secret with a hash value matching a substring of the data stream, identifying each secret with the same hash value as a potential secret.

The one or more computing systems can be configured to: maintain data corresponding to groups of entities within the one or more entities, each group comprising zero or more subgroups and organized according to a hierarchy, shard the data stream according to digital documents associated with same groups or subgroups; and generate a respective search data structure corresponding to secret data for each entity in a respective group.

Each of the one or more filters can represent the existence or absence of secrets in the shard with non-zero probability.

In processing the potential secrets, the one or more computing systems are configured to: process, through each search data structure, respective potential secrets corresponding to entities within the same group or subgroup corresponding to a respective shard.

Wherein in sending an indication of the presence of the one or more secrets to one or more computing devices, the one or more computing systems can be configured to send the indication to at least one computing device of an entity within a first subgroup different than a second subgroup of the one or more entities, the first subgroup and the second subgroup within a same group according to a hierarchical arrangement.

Each search data structure can be a respective Aho-Corasick finite state automaton.

Each filter can be a respective Bloom filter.

The one or more computing devices can be associated with the same group or subgroups of the one or more secrets and are authorized based on the association with the same group or subgroups receive the indication.

Wherein in sharding the data stream, the one or more computing systems can be configured to: shard the data stream according to digital documents belonging to a first group comprising one or more subgroups, before querying the hash values through the one or more filters, each filter corresponding to secrets for the first group; and shard the filtered data stream according to digital documents belonging to the one or more subgroups of the first group, before processing the potential secrets through the one or more search data structures, wherein the one or more search data structures correspond to secret data for one of the one or more or more subgroups.

The one or more computing systems can be further configured to cause the detected secrets to be deleted or updated.

DETAILED DESCRIPTION

Overview

Figure 1:
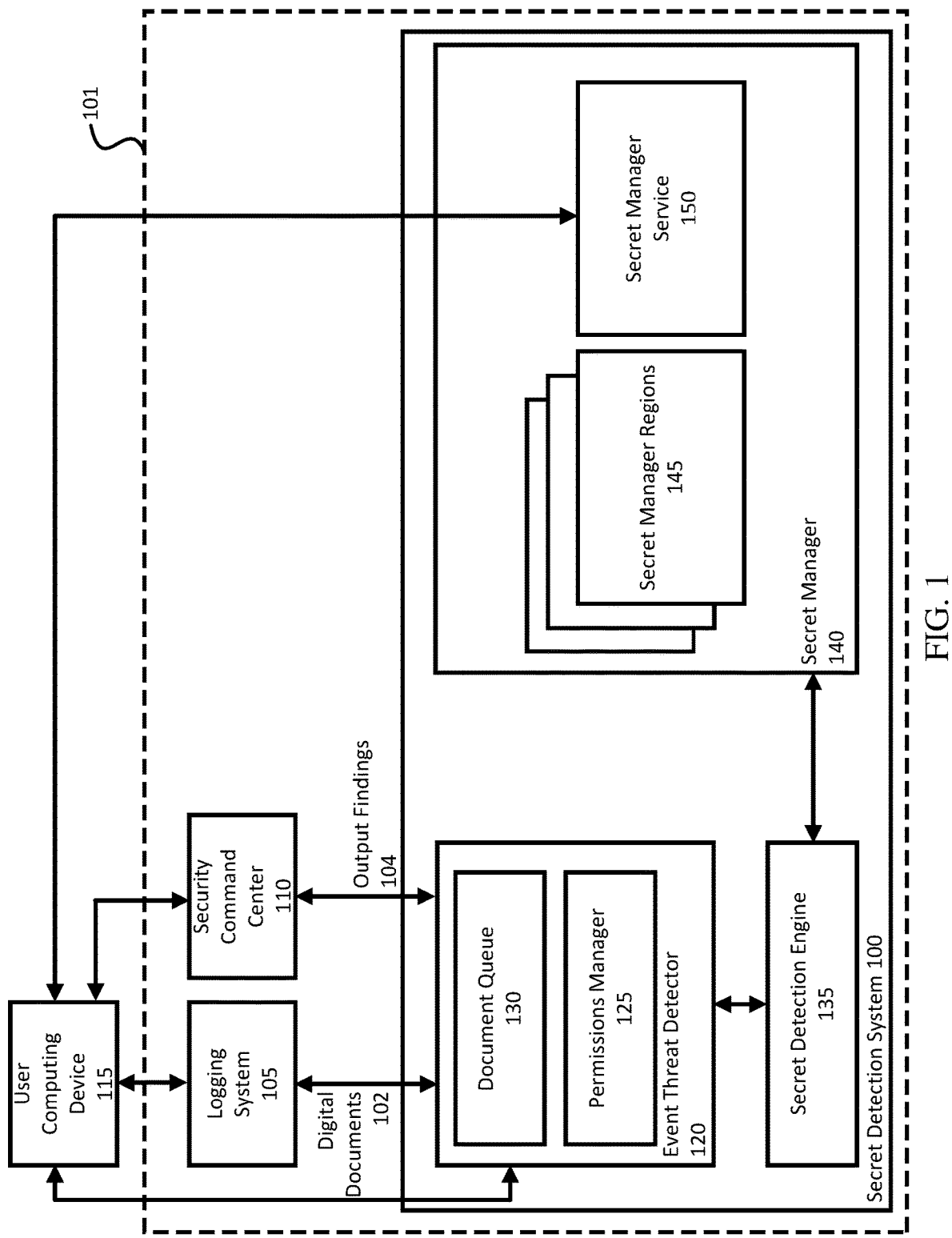
FIG. 1 is a block diagram of an example secret detection system, according to aspects of the disclosure.

Aspects of the disclosure provide for an end-to-end system for detecting and responding to secret data leaked on a computing platform implementing the system. The system may evaluate digital documents generated by one or more computing devices and/or communicated between devices on a network for potential secrets. Potential secrets may be compared to known secrets stored in a repository whose data is retrieved by the system. If the system identifies a match, the system can notify an administrator for affected users, devices, or groups of users and/or devices affected by the secret leak. Potential secrets can be rapidly and deterministically compared with known secrets in the repository, without exposing the secrets to outside parties. The system can be implemented alongside other systems on a platform, such as systems for storing secrets. Example secrets can be cryptographic keys, API tokens, and/or digital certificates. The end-to-end system as described herein provides additional functionality in detecting secrets, on top of platforms already securely storing known secrets.

After determining a secret leak, the system may institute actions to automatically prompt affected users to update or rotate out potentially compromised secrets, and/or the system may institute actions to automatically rotate potentially compromised secrets, before the existence of the leak is identified by malicious actors. A rotated secret is a secret that is no longer in use for its intended purpose. For example, a rotated encryption key is not used for encrypting data. A rotated API token is not used for accessing certain types of data through an API.

The system can manage user association by different group hierarchies. The system actions can vary in scope depending on which group or groups of users or devices are affected by the leak. When a secret leak is detected, the system can not only identify the source of leaks from applications or services associated with a particular group of users, but also cross-reference sibling groups within the same organization that may be sharing the same compromised secrets. This cross-referencing can reduce the time of exposure of leaked secrets. Reducing the exposure of leaked secrets can improve the operation of the platform, for example by reducing the risk of a security breach or hindrance to the availability of platform computing resources by an adversary.

The system described herein eliminates the need for third-party resources or tools. Leveraging a centralized platform configured for securing secrets reduces the risk of secrets being exposed, at least by following the principle of reducing the number of parties with potential access to the secrets. The system as described herein can work over a security layer of processes maintained by the platform for data residency, encryption, and/or other processes for maintaining secrets on the platform.

Aspects of the disclosure are directed to a system for distributed string-matching of contents of a plurality of digital documents with a list of known secrets, to detect potential secret leaks. The list of known secrets can be retrieved from a repository by a computing platform. A stream of incoming documents can be filtered according to one or more filters, such as one or more Bloom filters, generated using hashes of prefixes of strings or raw bytes in the incoming documents of the stream. The one or more filters can be generated using an indexed set of hashed secrets stored on the platform. The system can shard the digital documents according to each group or subgroup of users. In this way, operations related to the use of stored secrets on the platform can reside in computing resources previously designated for storage, for example by users or devices providing the secrets. The distributed filtering and matching of secrets to portions of digital documents received by the system can also improve processing through the use of more computational resources on the platform.

The secret detection system is not limited to matching secret data with portions of incoming data streams of digital documents. In some examples, the system is configured to identify any of a variety of types of data maintained by a computing platform, the identification of which in a data stream may be required according to different use cases. For example, the secret detection system can be configured to detect leaked benign data, to identify workflows or processes where actual secrets may be inadvertently leaked.

The system can process structured and unstructured documents. A structured document follows a particular defined format, such as an HTTP header, an XML document, a JSON document, or a network activity log. An unstructured document does not follow a particular defined format, such as an email, a text message, or any type of data object in general. For structured documents, the system can perform any of a variety of tokenization processes to tokenize the document, as described herein. Delimiters, such as brackets, white space, etc., can be predetermined, for example based on the structure of the document. As described herein, the system is configured to process unstructured documents to detect secrets without first tokenizing the unstructured documents.

The system can be configured to receive portions of digital documents, or the entire contents of a digital document at once. For example, the system can be configured to receive and process individual rows of a network log, to determine whether each individual row contains a leaked secret. A single row of a network log may be considered a digital document, and also be a portion of a larger digital document, for example the entire network log. As described herein, based on the exact input, the system can be configured to filter the incoming stream of digital documents according to different modes of operation, such as "exact-match mode" and "within-match mode," having different trade-offs in terms of false-negative accuracy and computational efficiency.

Filters can be generated by the system to be queried to return one of two results: either that an input string or substring of a document does not exist within the indexed secret data; or, that the input string may exist in the secret data with a non-zero probability. The system generates a filtered stream of potential starting locations of secrets within the stream of documents. The initial filtering can be performed to reduce computational resources required for performing string-matching on a full stream of data. Substrings can be queried to determine exact matches, or partial matches in which the substring potentially includes at least a portion of a known secret. The filtering can remove a majority of data as potential secrets, leaving a relatively small subset of potential secrets to be further processed as described herein.

For a given received document, the system can process the document through one or more filters to identify locations of potential leaked secrets for further processing. In an exact-match mode, the system queries a hashed prefix of a predetermined minimum length of the contents of a received digital document against one or more filters, to determine whether the hashed prefix matches a hashed prefix of a known secret used to generate the queried one or more filters. In a within-match mode, the system queries hashed prefixes of substrings of the contents of the received digital document against the one or more filters, to determine whether at least one hashed prefix for a substring matches the hashed prefix of a known secret used to generate the one or more filters.

As described herein, the system can automatically determine or receive parameters for determining whether to filter incoming documents according to exact-match or within-match mode. Exact-match mode can be more computationally efficient, for example measured by the number of processing cycles, but may result in more false positive results. Within-match mode can be less computationally efficient, for example because more processing cycles are required to filter a digital document in this mode, but can result in fewer or no false positive results.

The system can perform the initial filtering with secrets corresponding to an organization of users, and shard the filtered stream into documents generated from different projects within the organization. Secret data can also be sharded according to secret data provided by entities in different groups or subgroups. The system can generate one or more search data structures for each shard of secret data, which the system uses to match with secrets in the data stream. Example search data structures include Aho-Corasick finite state automata (also sometimes referred to as Aho-Corasick finite state machines), which can be generated using the Aho-Corasick string-searching algorithm.

Example Systems

FIG. 1 is a block diagram of an example secret detection system 100, according to aspects of the disclosure. The secret detection system 100 can be implemented on one or more computing devices in one or more physical locations. For example, system 100 can be part of a computing platform 101, which can also include components such as a logging system 105 and a security command center 110, and be in communication with one or more user computing devices, such as user computing device 115. In FIG. 1, platform 101 is indicated by a dashed box.

The computing platform 101 can offer various services to entities in communication with the platform 101. Entities can include users, devices, or groups of users and/or devices organized according to a predetermined hierarchical arrangement on the platform 101.

For example, various users can collaborate on software projects, which may be hosted on the platform 101 as one or more applications or services. Software, such as software for hosted projects, may be hosted in storage devices, such as storage devices 330 described herein with reference to FIG. 3. The applications or services can be interacted with by computing devices, such as user computing device 115, for example, to receive requests or queries, and to generate responses for those requests or queries. The computational resources, for example, virtual machines, compute power, storage, etc., may be allocated to a group of users and collectively associated with that group as a "project." Computational resources can include processors and storage devices, such as processors in a server computing device 315 and the one or more storage devices 330 of the platform 101 as described herein with reference to FIG. 3. Similarly, groups of users organized in projects may be part of larger collectives. For example, an organization of users can represent users across an enterprise or institution interacting with the platform 101. Subgroups can be subdivided even further. For example, each folder of a project may be associated with one or more entities within the project and store one or more digital documents which can be processed for secret detection.

Users and/or automated software can interact with the platform 101 through one or more user computing devices. The user computing device 115 can be associated with one or more users (not shown). The user computing device 115 can interact with the platform 101 over some interface, for example an application interface or a web interface, while logged into a user account associated with one or more users. Various components and/or user devices can communicate among one another. For example, components or user devices can communicate using one or more APIs exposing functions or services provided by the various components.

In some examples, the user computing device 115 may not be operated by a user, but instead is configured to communicate with the platform automatically. For example, the user computing device 115 may be operated through an application or other software executed on the user computing device 115. In those examples, the application or software may have a platform account, and be associated as an entity or as part of an entity on the platform 101.

As described, entities such as users can be logically organized according to a hierarchical arrangement. Some entities within a group, for example an organization of users, can have access to respective user accounts with some relative degree of authorization to perform certain actions on behalf of the organization on the platform 101. For example, some user accounts may be administrators, with authorization to enable or disable certain features provided on the platform 101, such as the secret detection system 100. Because some groups can include subgroups, in other examples different user accounts can have different levels of administrative privilege that may be limited to particular subgroups but not to the entire group overall. The secret detection system 100 can be configured to communicate, for example, the presence of one or more leaked secrets, with computing devices associated with authorized user accounts.

The platform 101 can host a number of virtual machines, each of which can run several services and/or software applications. The platform 101 can host the virtual machines using a combination of one or more processors and storage devices, for example one or more processors 313 of a server computing device 315 and storage devices 330, as described herein with reference to FIG. 3. Hosted applications and services can generate digital documents. Digital documents can include, but are not limited to, network event logs, internal processing logs, source code, source code documentation, network traffic data such as HTTP requests and responses, chat messages, blob storage, files, various structured and unstructured data, batches of data, streams of data, and output from applications and/or services running on the platform 101 and associated with a particular project, user, or organization. Digital documents can also be user-generated, manually prepared, or automatically prepared as part of executing a software application on the platform 101, such as emails, reports, word-processing documents, etc. Digital documents can be portions of larger documents, for example a digital document can be a single line of a network log, itself being a digital document.

On the platform 101, the logging system 105 receives documents 102, for example through the user computing device 115 or other devices of the platform 101. The logging system passes the digital documents 102 to the secret detection system 100. The system 100 processes the digital documents 102 using the event threat detector 120 and the secret manager 140, and generates one or more output findings 104. The secret manager 140 manages regions of secret data, and generates filters and search data structures used by the secret detection engine 135. The secret detection engine 135 uses the filters and search data structures to filter out the digital documents 102 and match document text with known secrets maintained by the secret manager 140. Output findings 104 generated by the event threat detector 120 indicate whether secret leaks were detected by the system 100 from the digital documents 102.

The output findings 104 can be sent to the security command center 110, configured to forward at least some information from the output findings 104 to administrators or authorized devices of groups affected by the secret leak. The security command center 110 can also take action in response to the secret leaks, for example by sending prompts to affected computing devices to rotate out compromised passwords or API tokens. In some examples, actions performed by the security command center 110 can be automatically performed in response to a leaked secret. For example, the security command center 110 can be configured to automatically rotate potentially compromised secrets according to a predetermined process.

In addition or as an alternative to rotating potentially compromised secrets and/or prompting users, the security command center 110 can take any of a variety of other actions. For example, the security command center 110 can quarantine or block activity or access to resources associated with the leaked secret, such as restricting access to password-protected data upon detecting that the password has been leaked. The security command center 110 can delete the leaked secret or cause the leaked secret to be deleted from a repository of stored secret data, as described herein.

Digital documents 102 can be sent to an event threat detector (ETD) 120 as a data or document stream. The digital documents 102 can be sent, for example, by the user computing device 115, or by the logging system 105. The logging system 105 can be configured to receive data and generate logs of activity on the platform 101. The logging system 105 can generate logs specific to certain applications or services within the control of certain project groups or organizations, as examples. The logs can capture a variety of information. In some examples, logs are generated as output during or after a period of software development for different hosted applications or services. For example, software developers may program an application to periodically generate logs for determining the status of the application, which can be used for debugging or refactoring source code for the application.

The ETD 120 can include a permissions manager 125 for managing and verifying incoming digital documents to first determine whether the source of the digital documents is authorized to communicate with the ETD 120. For example, an entity may have different permissions set for whether or not the ETD 120 is available for processing digital documents generated within different scopes. Permissions can be set at the group or subgroup level. For example, an administrator of an organization can authorize downstream processing of digital documents generated by the organization, and/or selectively permit downstream processing for digital documents from some organizational entities, but not others. As a further example, some entities may define different projects in the organization, which may or may not have adequate permissions for processing digital documents by the ETD 120.

After checking for valid permissions, if applicable, the ETD 120 receives the digital documents 102 as a stream of data, and places the data in a document queue 130. Digital documents in queue 130 are fed into the secret detection engine 135. As described in more detail with reference to FIG. 2, the secret detection engine 135, in communication with the secret manager 140, can generate the output findings 104. Output findings 104 can indicate whether a corresponding digital document contained a secret detected by the secret detection engine 135. For example, the output findings 104 can include metadata corresponding to the leaked secret, such as the time or date of the leak, computational resources, such as virtual machines or memory devices, that had access to the digital document with the leaked secret, and how many times the secret was leaked in the digital documents.

If secrets are detected, the output findings 104 can indicate this detection. The security command center 110 can be configured to process the output findings 104, and take some course of action in response. The security command center 110 can include one or more platform computing devices and be configured to track and respond to instances of leaked secrets. For example, the security command center 110 can alert authorized devices, such as the user computing device 115, of the detected secret leak. As described herein, the user computing device 115 may be authorized to receive the output findings or other information related to secret leaks on behalf of particular groups or subgroups of the platform. In other examples, if the output findings 104 indicate that no secrets were detected, processing can continue with new documents, or, in some examples, the security command center 110 can affirmatively indicate to the user computing device 115 that no secrets were detected.

If secrets were detected as indicated in the output findings, then the security command center 110 can take one or more of a variety of different actions. The security command center 110 can send a prompt to the user computing device 115 from which the digital documents 102 were received to begin a secret update/rotation process, for example, a process to change a password to refresh an API token. Through information provided in the output findings, the security command center 110 can provide details regarding the secret leak. For example, the security command center 110 can identify resources, such as a virtual machine, application, or service, from which the digital document including the leak was generated. Identified resources can also help to determine the source of the leak, and additional information can also include a timestamp of the creation of the leaking digital document.

In addition to secret detection as described herein, the ETD 120 can also provide a variety of other services. Example services include processes for anomaly detection, detecting unauthorized access to platform resources, detecting unauthorized cryptomining, and detecting attacks against the platform 101, for example, by DDoS or brute-force SSH. In some examples, the secret detection engine 135 is implemented as a component separate from the ETD 120. Like other components of the system 100 as described herein, the secret detection engine 135 may be implemented on or more computing devices that are physically remote from the ETD 120.

The secret detection system 100 also includes the secret manager 140. The secret manager 140 can include one or more secret manager regions 145 and a secret manager service 150. As described in more detail with reference to FIG. 2, different components of the secret detection system can be physically collocated with storage devices at least partially storing known secrets maintained by the platform 101. A region 145 can refer to a collection of devices implementing at least some of the components described herein, and are physically located in proximity to one another. Physical proximity can refer to, for example, the same datacenter or the same physical device, such as a server rack of devices.

The secret manager 140 is configured to manage secret data received from computing devices of entities of the platform 101. Computing devices can communicate with the secret manager 140 using the secret manager service 150. The secret manager service 150 can be an interface, such as a web page or application, or can define one or more APIs exposing various defined functions of the secret manager 140 to a user computing device. Those functions can include adding, modifying, and deleting secrets corresponding to one or more entities for safe-keeping on a secrets repository. Secrets stored and managed by the secret manager 140 are referred to as known secrets in this specification.

The secret manager 140 can implement any of a variety of encryption protocols for encrypting secrets provided by various entities. As additional secrets are provided to the secret manager 140, for example through the secret manager service 150, the secret manager 140 can encrypt the secrets. The secret data is encrypted when stored in the repository, and is temporarily decrypted for processing before being re-encrypted. Secret data, filters, and search data structures as described herein at rest can be encrypted. Multiple keys—such as keys managed by one or more users or by the secret manager 140, may protect secrets stored by the secret manager 140 and when stored in filters or search data structures as described herein.

For example, the secret manager 140 can use a respective key-encryption-key (KEK) for each secret received and stored. For example, the KEK can be user-generated and provided along with the secret data from a user computing device. For each secret managed by the secret manager 140, the manager 140 can generate a data-encryption-key (DEK) to encrypt the secret data. The manager 140 can encrypt the DEK with the provided KEK. Envelope encryption can refer to the process of encrypting the secret data with the DEK, followed by encrypting the DEK with the KEK. Each secret managed by the secret manager 140 can be envelope encrypted. KEKs can be selectively enabled or disabled, which can control which secret data is encryptable or decryptable on the platform 101. In some examples, the secret manager 140 can include a customer-managed encryption key (CMEK) system for managing encryption keys provided by users of the platform 101.

Further to the descriptions above, a user may be provided with controls allowing the user to make an election as to both if and when systems, programs, or features described herein may enable collection of secret data and digital documents, such as logs, and if the user is sent content or communications from the system 100. In addition, certain data may be treated in one or more ways before it is stored or used, so that personally identifiable information is removed. For example, digital documents may be received by the system 100 after appropriate document scrubbing to remove sources of user data. Thus, the user may have control over what information is collected about the user, how that information is used, and what information is provided to the user. The digital documents received by the system 100 are not identifiable to a specific user.

Secret data in the repository is maintained across one or more secret manager regions 145. The secret manager region(s) can be collections of computing resources, such as processors, virtual machines, memory devices, located within a particular physical region. In addition or alternatively, the secret manager regions 145 can correspond to computing resources managing secret data for a particular group or groups of entities. As an example, a region may be defined for one or more different organizations, each having multiple projects and multiple users associated with each project.

Devices implementing at least some portions of the secret detection system 100 with storage devices storing known secret data located in the same physical region can have a number of technical advantages. For example, the secret data can be indexed, and one or more filters and/or search data structures can be generated in the same secret manager region as where the secret data is stored, reducing computational cost to transfer the secret data to one or more physically remote devices. Computational cost can be measured, for example, in terms of reduced network bandwidth from not needing to transfer the secret data, and/or the reduced number of processing cycles to transfer the data, and/or the reduced clock time or latency otherwise incurred by transferring secret data.

Collocating devices as described in more detail with reference to FIG. 2 can also reduce the risk of exposure of secret data otherwise transmitted over a network to a central processing location. Transmission over large distances may be over several networks or bridging devices, each of which potentially having one or more vulnerabilities that can be exploited by an adversary to intercept, modify, and/or corrupt transmitted secret data. This risk is reduced but not eliminated by encrypting the secret data.

The secret data and/or the data stream can be encoded as strings, or according to any format, such as a series of raw bytes, for processing, including filtering and matching, as described herein.

The secret manager 140 as described herein can also manage the encryption of filters and/or search data structures used by the secret detection engine 135 for performing secret detection, as described herein. Because individual secrets can be envelope encrypted at least using encryption keys that are provided by devices in communication with the platform 101, the secret manager 140 can encrypt filters and/or search data structures made from multiple individual secrets to preserve this additional layer of security provided by envelope encrypting as described herein.

In some examples, the secret manager 140 can encrypt the filter or search data structure using a separate DEK for the filter or search data structure. The secret manager 140 can generate the per-filter or per-search-data-structure DEK as a function of the per-secret DEKs represented by the filter or search data structure. For example, the secret manager 140 can generate the per-filter or per-search-data-structure DEK in a variety of different manners. For example, the per-filter or per-search-data-structure DEK can be generated as a function of each per-secret DEK. In other examples, the per-filter or per-search-data-structure DEK can be a serial decryption using each per-secret DEK. The separate encryption or decryption using per-secret DEKs can be performed at-scale, at least because the secret manager 140 can at least parallelize the operations over multiple processing elements. If a per-secret KEK is disabled, the per-filter or per-search-data-structure DEK cannot be encrypted or decrypted, accordingly.

In some examples, instead of generating a per-filter or per-search-data-structure DEK based on each per-secret DEK, the secret manager 140 can monitor the status of each per-secret KEK to determine whether the KEK has been enabled or disabled. The secret manager 140 can invalidate a per-filter or per-data structure KEK based on determining that one or more of the per-secret KEKs are disabled. The secret manager 140 can save the keys only in volatile memory and not in disk or persistent storage to reduce the risk of exposure of the encryption/decryption keys. The secret manager 140 can leverage an extendable time-to-live (TTL) or some expiration time on the in-memory KEKs to guarantee that the per-filter or per-data-structure KEK is invalidated within a fixed time from when a per-secret KEK is disabled, based for example on the TTL or expiration time. The secret manager 140 can also store other encrypted data, such as the secret data and/or filters or search data structure in volatile memory.

Figure 2:
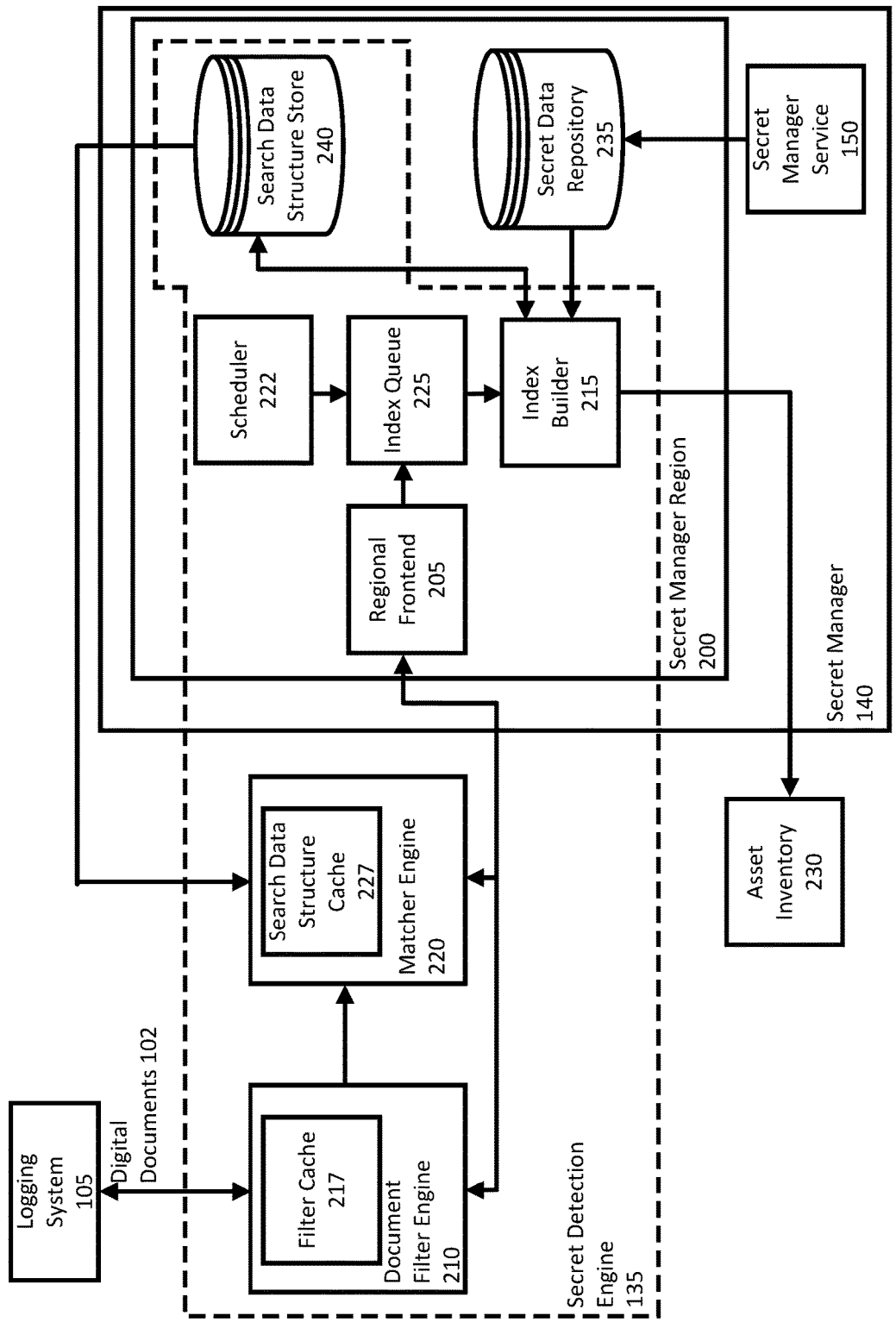
FIG. 2 is a block diagram of a secret detection engine communicating with a secret manager region, according to aspects of the disclosure.

FIG. 2 is a block diagram of the secret detection engine 135 communicating with a secret manager region 200, according to aspects of the disclosure. The secret manager region 200 can be one of the one or more secret manager regions 145, as described herein with reference to FIG. 1. The secret detection engine 135 can communicate with components of the secret manager region 200 through a regional frontend 205.

The secret detection engine 135 can include a document filter engine 210 and a matcher engine 220. The secret detection engine 135 can include a number of additional components, implemented on one or more devices that are the same or different than one or more devices implementing the document filter engine 210 and the matcher engine 220. For example as shown in FIG. 2, the secret detection engine 135 can include a regional frontend 205, a scheduler 222, an index queue 225, an asset inventory 230, and an index builder 215. Some or all of the components of the secret detection engine 135 described herein can be implemented on devices in a secret manager region 200. The secret manager region 200 can refer to a physical region or location in which one or more devices at least partially implementing the components described herein are located.

As described herein with reference to FIG. 1, components of the secret detection engine 135 can be implemented in the same region, for example to conform with data residency requirements and/or to improve secret detection, at least through reduced network traffic and reducing potential exposure of secret data to potential adversaries. The document filter engine 210 and the matcher engine 220 can be implemented on devices in a separate region as the secret manager region 200. For example, the document filter engine 210 and the matcher engine 220 can be implemented on devices in the same region as the logging system 105 and/or other components of the platform 101.

In some examples, all of the components of the secret detection engine 135 as described herein can be implemented on the same device, and/or on one or more computing devices in the same physical region or location. For example, all of the components of the secret detection engine 135 can be implemented on the same server device. The server device can communicate with a secret data repository 235 managed by the secret manager 140. The secret manager 140 can be implemented on the same server device, or in some examples, on one or more computing devices separate from one or more computing devices implementing the secret detection engine 135.

The document filter engine 210 can receive a filter generated from secret data, and use the filter to filter out text from the digital documents 102 determined by the document filter engine 210 not to include secret data. The matcher engine 220 receives the filtered stream of documents and a search data structure of secrets from a secret manager region 200. The matcher engine 220 identifies secret leaks in the filtered stream, the presence of which can be included as output findings 104 to the security command center 110, as shown in FIG. 1.

Secret manager region 200 includes a regional frontend 205 for interacting with the secret detection engine 135. The secret manager region 200 manages at least a portion of secret data on the platform 101, in a secret data repository 235. The secret data in the secret data repository 235 is indexed by the index builder 215, which is also configured to generate filters and search data structures for the document filter engine 210 and the matcher engine 220, respectively. New secrets can be added through the secret manager service 150.

The secret detection engine 135 receives the digital documents 102 at the document filter engine 210. The document filter engine 210 includes a filter cache 217 and is configured to process a data stream formed by the digital documents 102 to filter out data with little to no probability of including leaked secrets. The data stream can include one or more strings of data from each digital document. The document filter engine 210 can preprocess incoming digital documents and convert the contents of the digital documents into a stream of encoded strings or encoded into another format for processing by the system 100.

The output of the document filter engine 210 indicates the existence of potential secrets in the data stream. Potential secrets are portions of the data stream in which the probability of the presence of a leaked secret meets some threshold predetermined at the document filter engine 210. For example, the document filter engine 210 can generate metadata indicating the starting position of potential secrets in the data stream. The document filter engine 210 determines the existence of potential secrets without false-negatives and a predetermined false-positive probability, by ingesting indexed secret data and one or more filters from the secret manager region 200.

The regional frontend 205 can be configured to provide the secret detection engine 135 with one or more filters for processing the data stream. The one or more filters correspond to indexed secret data corresponding to a particular scope defined by a request from the secret detection engine 135. For example, the request to perform secret detection on a data stream of digital documents received by the secret detection engine 135 can be scoped to secrets corresponding to a particular group, such as a particular organization or project. In response to receiving a request for indexed secret data, the regional frontend 205 can provide the indexed secret data scoped to the particular group. The indexed secret data can be sharded from a larger database or repository of secret data. The indexed secret data can be used by the index builder 215 of the secret manager region 200 to generate one or more filters and/or one or more search data structures.

Secret data maintained in the secret data repository 235 can be indexed by an index builder 215. Secrets in the secret data are hashed by the index builder 215 to generate a respective index for each secret. The index for a secret can be a prefix hash of a minimum predetermined length, for example 8 bytes worth of string data. The minimum predetermined length can also be a minimum length imposed on secrets stored in the secret data repository 235, to ensure that a prefix hash can be generated for each secret.

Sharding the secret data as described herein can have a number of technical advantages. Each secret manager region 145 can be individually responsible for indexing its portion of secret data, allowing for more rapid and frequent updating of the index in response to changes to the secret data, versus managing the secret data as a whole. As with the index, the filters and search data structures generated by the secret detection system 100 can be more efficiently generated and used for filtering and secret matching, respectively. This is at least because the amount of data processed is sharded across the regions and the scope of data processed is limited.

Further, maintaining separate regions may be required per data residency requirements for the secret data, which may be imposed by various parties, including the users themselves. Each region 145 can generate a respective filter and search data structure, both of which can be cached by the secret detection engine 135 for performing secret detection. In some use cases, the secret manager 140 is configured to process and store secret data under different approaches, for example, based on the physical or geographic region in which the secret data is stored. Sharding the storage and processing of the secret data in this manner can also satisfy these use case requirements while allowing for the generation of more compact filters and search data structures for faster filtering and searching, respectively.

Requests to perform secret detection on input digital documents can be resolved by components of the secret detection engine 135 implemented in a region matching the region of the computing device from which the secret detection request is received. Indices, filters, and/or search data structures used to resolve the secret detection request can be generated in the corresponding secret manager region. In this way, secret data is at rest, in transit, or in use in the same region or regions that can be, for example, predetermined based on user input. The generated indices, filters, and/or search data structures can be encrypted and transmitted to the document filter engine 210 and the matcher engine 220, which may or may not be in the same region as the other components of the secret detection engine 135 in the secret manager region 200.

Indices for secret data can be generated, updated, and destroyed based on the absence or presence of requests by the secret detection engine 135 for indexed secret data. For example, a scheduler 222 can be configured to push index requests to an index queue 225. The index requests can specify a range of secrets to index in the secret data repository 235. The scheduler 222 may periodically send requests to build new indices, for example as the secret data repository is updated with new or updated secrets over time. In other examples, the scheduler 222 pushes index requests only upon determining that a current index is out of date. An expiration date for the index can be predetermined, for example seven days from creation, and that time period can vary depending on use case. In other examples, the scheduler 222 pushes index requests upon determining that the regional frontend 205 has received a request for indexed secret data. The secret detection system 100 can perform routine garbage collection to remove indices past their expiration date.

The regional frontend 205 can also push index requests to the index queue 225 upon receiving a request from the secret detection engine 135 for secrets in a scope not currently indexed. For example, secret data for a single project may be scoped, and periodically updated by the index builder 215 through corresponding index requests provided to the index queue 225 through the scheduler 222. If the regional frontend 205 receives a request for index secret data for the entire organization, including the single project, then the regional frontend 205 can push corresponding index requests to the index queue 225. As part of pushing the index requests, the regional frontend 205 can receive updated metadata characterizing current projects within an organization.

The index builder 215 can pop index requests from the index queue 225, for example according to a queueing protocol, such as FIFO. In some examples, the index queue 225 and index builder 215 are maintained asynchronously, with the index queue 225 being fed new index requests during a first time period. The index builder 215 can process popped requests from the index queue 225 during a second time period. In other examples, the index queue 225 and index builder 215 are maintained synchronously: the index builder 215 can continuously process index requests as they are pushed by the scheduler 222 into the queue 225.

Aspects of the disclosure provide for secret leak management by identifying groups whose secrets are leaked, as well as related groups who may also be potentially at risk. The index builder 215 can access an asset inventory 230, which manages and resolves the scope of secret detection performed by the system 100 in a given instance of secret detection.

For example, if a request from the secret detection engine 135 is scoped to a particular organization, then the asset inventory 230 can provide information identifying the organization and all subgroups, for example, projects, within that organization. Metadata in the asset inventory 230 can be maintained by the platform 101 as part of hosting and maintaining projects and associated entities for each project. Thereafter, the index of the scoped secret data can be maintained through periodic requests from the scheduler 222. The index builder 215 can generate an index for secret data for all groups and subgroups within the scope specified by the asset inventory 230. As another example, the request from the secret detection engine 135 may be scoped only to a particular project within an organization. The index builder 215 can receive data from the asset inventory 230 to ensure that only secrets scoped to that particular project from the organization are indexed.

By accurately obtaining the scope of possible affected groups for secret detection, the system as described herein can provide for a number of technical advantages. For example, as the system maintains secret data and performs secret detection as an end-to-end pipeline, the risk of potentially omitting potential sources of secret leaks from the desired scope is mitigated.

Related groups, for example sibling projects to an organization, can be included in the scope of secret detection not only for detecting leaked secrets, but for also notifying respective authorized devices when a project in the same organization has its secrets leaked. Other approaches, such as manually providing a list of known secrets for secret detection against one or more digital documents, do not have this safeguard in place and can potentially place a group at risk even if that specific group's secrets are not leaked.

The index builder 215 can generate one or more filters from the indexed secret data. Although only a single filter is described herein, any number of filters may be generated. The filter can be a data structure that can be queried with an input string, to determine whether some source of data, such as the secret data repository 235, includes that input string or not. For example, the index builder 215 can generate a Bloom filter from the indexed secret data. The filter may be configured to be queried to return one of two results: either that the input string does not exist in the secret data repository 235 with a probability of one; or, that the input string may exist in the secret data repository 235 with a non-zero probability. The probabilities that each queried input string matches a secret can be predetermined as part of generating the Bloom filter. The index builder 215 can generate the filter along with indices for the secret data within the desired scope. The regional frontend 205 can provide the document filter engine 210 with the filter, and the document filter engine 210 can cache the filter in the filter cache 217.

The index builder 215 can build the filter according to the prefix hash used to index each secret within the specified scope. The regional frontend 205 can cause the index builder 215 to generate the filter in response to receiving a request for filters by the secret detection engine 135. If an index is not currently built, or if the current index is expired, then the regional frontend 205 can also cause the index builder 215 to rebuild an index for secret data scoped to a corresponding request for filters.

When the filter is received and cached, the document filter engine 210 can query the filter with a hashed prefix of a substring in the data stream. As a preprocessing step, the document filter engine 210 can hash the data stream according to the same hash function used to hash the prefixes of the indexed secret data. The length of individual hash values queried at the filter can be of the minimum predetermined length, for example, 8 bytes, taken from the secrets to generate the corresponding indices.

With the hashed data stream, the document filter engine 210 can query the filter with successive substrings of the hashed data stream to determine whether each queried substring is a potential secret. For example, the document filter engine 210 can be configured with a prefix version of the Rabin-Karp algorithm. Beginning at position 0 (i.e., the first character, byte, or symbol of the hashed data stream), the document filter engine 210 queries the filter to identify whether the substring is at least a prefix of a potential secret stored in the secret data repository 235. If the substring is not at least a prefix of a secret, then the query from the filter results in zero (or some negative indication). Otherwise, the query is returned with a positive indication of the substring being at least a prefix of a potential secret. The positive indication is based on a false-positive probability determined as part of generating the filter, as described herein. At this stage, the document filter engine 210 may return a false positive result, e.g., indicating that a substring is a secret when in fact it is not. False positives can be further reduced or eliminated by the matcher engine 220, described herein.

The probability at which the positive indication is generated by querying a filter can be adjusted as a function of characteristics of the filter. For example, the filter can be a Bloom filter, at least partially represented as an array or other data structure. The array or data structure for the Bloom filter can be adjusted larger to reduce the false-positive probability at which the filter returns a positive indication that a substring matches a known secret (at the cost of additional memory required to store the filter), or reduced to be more memory efficient, but at the cost of an increased false positive rate.

If the document filter engine 210 receives a positive indication that substring is at least a prefix of a secret or positive indication that a substring may be prefix of a secret in the scoped secret data, then the document filter engine 210 saves the position of the substring in the data stream. For example, suppose the first substring from positions 0 to k (where k is the minimum predetermined length) is identified as a potential secret. The document filter engine 210 can save the position 0 as the starting position of a potential secret, and continue processing. The document filter engine 210 can query the next substring, from positions 1 to k+1, and save the position 1 if the second substring is also identified as a potential secret. The document filter engine 210 can continue to process all possible substrings of length k, thereby finding all possible secret prefixes.

The document filter engine 210 can operate according to an "exact-match" or a "within-match" mode. The document filter engine 210 can support exact-matching and within-matching of known secrets with substrings in the filtered data stream. The document filter engine 210 can operate in one of multiple modes supporting either configuration. Which mode the document filter engine 210 is operating in can be specified at the time the digital documents are sent to the secret detection system 100, for example as part of a request specifying one or more parameters for how secret detection should be performed on the digital documents. In other examples, the document filter engine 210 can automatically perform filtering according to exact-match or within-match mode, depending on characteristics of the received digital document, described presently.

In exact-match mode, the document filter engine 210 checks only the hashed prefix of the contents starting at position 0 up to a predetermined minimum length for a digital document or a token within a structured digital document. The document filter engine 210 returns indications of the detection of secrets in the data stream if the substring exactly matches a known secret. In within-match mode, the document filter engine 210 checks within each hashed substring of a minimum predetermined length.

For a given document, the document filter engine 210 can receive a parameter indicating whether to perform exact-match or within-match filtering. In some examples, the document filter engine 210 may receive a document and filter portions of the document according to exact-match mode, while other portions of the document are filtered using within-match mode.

As described herein, digital documents received for filtering can include portions of larger digital documents. For example, in the case of a structured document, each digital document received for processing can be a token of a larger digital document. The document filter engine 210 can be configured to tokenize structure documents according to predetermined delimiters, such as white space or other symbols.

In some examples, digital documents received for filtering may have predetermined properties indicating under what circumstances a leaked secret would appear in the digital documents. For example, the document filter engine 210 may receive digital documents as individual fields of a XML document. In this example, the nature of the digital documents received may be such that, if a leaked secret is present, the leaked secret will match the entire contents of the digital document. In other words, if the document filter engine 210 receives individual fields, then if a secret is leaked in the digital document, it will be equal to the entire field. Based on this property, the document filter engine 210 can be configured to perform according to the more computationally efficient exact-match mode.

Further, the system can make a determination as to whether to perform filtering according to exact-match or within-match mode. Within-match mode can be used for both unstructured and structured documents, while in some examples exact-match mode can be used to process a structured document.

Exact-match mode can be more computationally efficient than within-match mode, for example measured in the number of operations to perform, at least because the system can rule out matches between substrings of a document and a known secret by checking whether the start of a substring, e.g., a character or a byte, matches any known secret represented in a search data structure used to perform the matching process. However, exact-match mode on unstructured documents can lead to false negatives, for example by missing some leaked secrets if the entire document is not a secret and rather a substring within.

Within-match mode can be used in filtering a digital document, for example when the document is unstructured. The document filter engine 210 can query the one or more filters with successive substrings of the contents of a digital document, each substring equal to the predetermined minimum length.

In some examples, the document filter engine 210 can apply multiple filters for identifying positions of potential secrets in the data stream. Each filter can vary, for example based on the length of the substring queried, or be generated from fewer or more secrets within the specified scope in the secret data repository 230. For example, the index builder 215 can generate a per-organization filter, as well as individual per-project filters, corresponding to data scoped to an organization and one or more projects, respectively. Depending on the nature of the request from the secret detection engine 135, the document filter engine 210 may first filter the data stream using the per-organization filter, and then filter the data stream according to a specified project filter.

The predetermined minimum length can vary from example-to-example. In general, the shorter minimum lengths, the higher the probability a random string in a processed digital document matches a random secret. In an extreme example, a minimum length of one will likely result in many potential secrets being identified, which can also increase the false-positive rate. A longer minimum predetermined length can be more efficient to perform filtering, for example because of fewer queries that need to be made, but the probability at which a random string in the process digital document matches a random secret is also decreased. An example minimum length can be eight characters.

The document filter engine 210 can provide the matcher engine 220 with the filtered data stream. The filtered stream can be the original data stream of digital documents 102 with metadata specifying the starting positions of potential secrets. In other examples, the filtered data stream is a subset of the data stream, including the substrings identified as potential secrets.

The matcher engine 220 can receive one or more search data structures from a search data structure store 240. The search data structure store 240 can be implemented as one or more memory devices configured to store one or more search data structures generated by the index builder 215. An example search data structure can be a finite state automaton including all secrets within a searched scope, which may be a shard of the secret data corresponding to a particular group or subgroup.

An example automaton is an Aho-Corasick (AC) finite state automaton. An AC finite state automaton can receive candidate data to search to determine whether or not the candidate data is in the shard used to generate the AC finite state automaton. An AC finite state automaton can be a trie or prefix tree in which internal connections between branches to a common prefix in the finite state automaton are precomputed. An AC finite statement automaton can transition between connected branches for a common prefix at least because backtracking is precomputed.

Another example automaton can traverse a trie (also known as a prefix tree) with nodes representing respective prefixes for each secret, as well as indices indicating where each secret is located. The example prefix tree can have a root representing the empty string, and child nodes corresponding to the first character of each secret represented by the trie. Subsequent children of these first child nodes can include the next characters for each prefix. All child nodes share a common prefix with their ancestor nodes. Although described as a prefix tree or trie, the automaton can be configured to traverse any of a variety of data structures, such as tables, including hash tables, and other graph structures.

The index builder 215 can generate one or more search data structures, such as an Aho-Corasick finite state automaton, which the matcher engine 220 can receive and cache in the search data structure cache 227.

By filtering the secret data as described herein, the system reduces or eliminates the possibility of false negative results, i.e., identifying data as not a leaked secret when in fact the data was a secret. By matching the secret data using one or more search data structures as described herein, the system reduces or eliminates the possibility of false positives, i.e., identifying data as a leaked secret when in fact the data was not a secret. The system can filter the digital documents to allow for more computational intensive processes, such as processes that are more accurate but require more time and/or processing cycles, to be performed on a smaller set of data more efficiently.

In some examples, instead of using a search data structure, the matcher engine 220 can use multiple filters to match potential secrets with known secrets of a secret repository. Using multiple filters instead of a search data structure can have the advantage of requiring less memory, for example because filters as described herein generally require less memory to represent versus a search data structure.

In these examples, the matcher engine 220 uses a series of increasing prefix filters, for example exponentially increasing prefix filters. For example, the matcher engine 220 can receive a set of filters, one filter generated from prefix hashes of known secrets of the minimum predetermined length, a second filter generated from prefix hashes of a larger length, for example double the minimum predetermined length, a third filter generated from prefix hashes of double the length of the second filter, and so on. An example set of filters can be of length 8, 16, 32, 64, and so on.

The matcher engine 220 can query filters using prefixes of increasing length, while identifying exact matches of strings of lengths in between the prefix lengths, to identify secrets in a digital document. For instance, if the document filtering engine 210 returns a potential match for a queried prefix of length 8, the matcher engine 220 can process the document at the starting position of the queried prefix to determine if the a substring of lengths 9, 10, 11, 12, 13, 14, or 15 exactly matches a known secret. For each length 9-15, the matcher engine 220 can query a filter generated using entire secrets, instead of prefixes of secrets. The matcher engine 220 can then query a filter generated using prefixes of secrets of length 16, to determine whether a substring matches a prefix of length 16. If not, the matcher engine 220 can halt processing. If a query for a filter at prefix length 16 is returned with a positive indication, then the matcher engineer 220 can query a filter generated using lengths 17-31, and repeat querying for a prefix of a secret at length 32, and so on.

In some examples, the matcher engine 220 can be configured to use search data structures instead of multiple filters, for example in use cases in which a more consistent average computational cost to perform matching by the matcher engine 220 is desired. In some cases, for example when a potential secret causes the matcher engine 220 to query each of the multiple filters, the worst-case computational cost can be much higher than using one or more search data structures, such as tries or AC finite state automata. Therefore, in various examples, the matcher engine 220 can be implemented to use search data structures and/or multiple filters depending on trade-offs desired between consistent computational cost for processing, and memory requirements.

Figure 3:
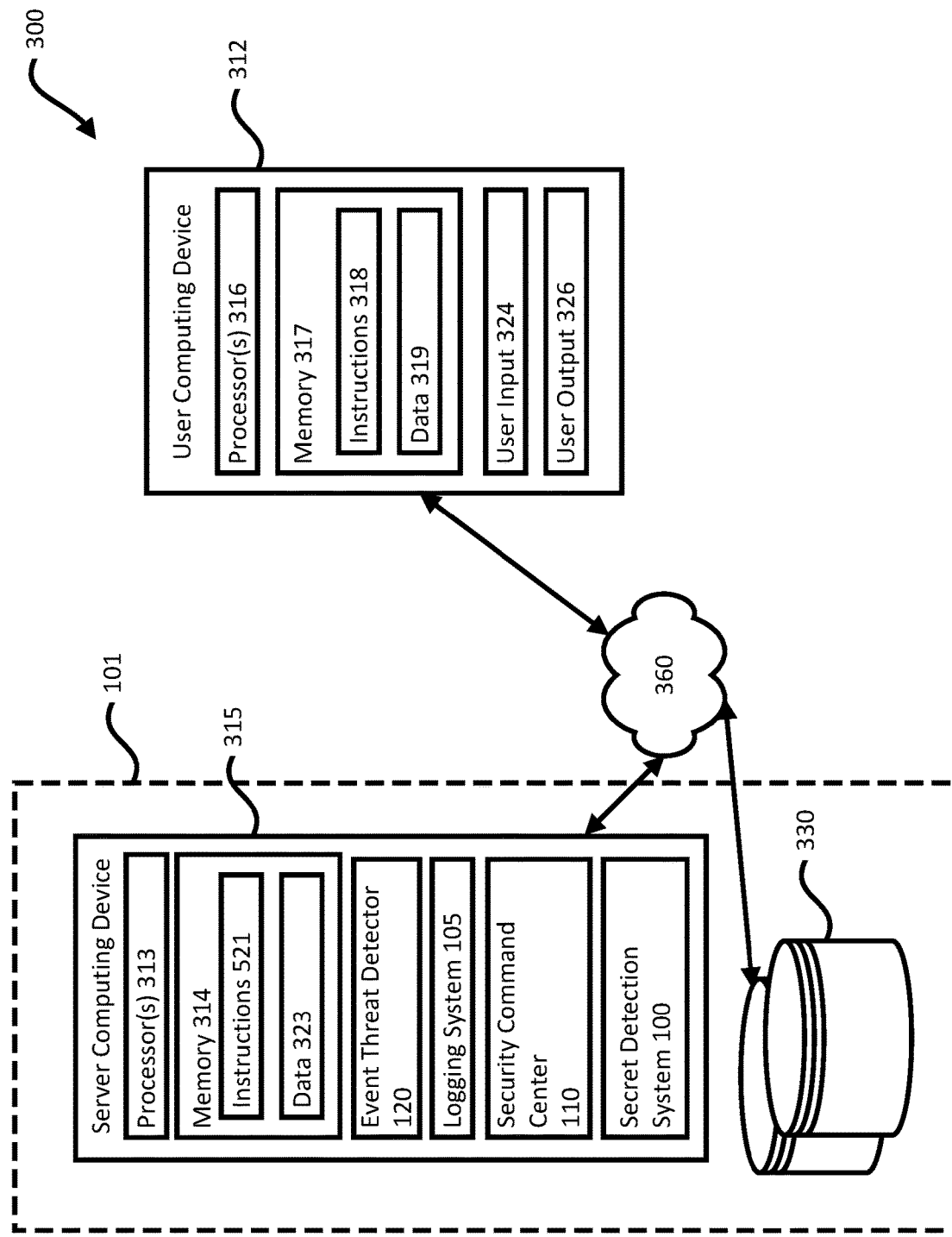
FIG. 3 is a block diagram of an example environment for implementing the example secret detection system.

FIG. 3 is a block diagram of an example environment 300 for implementing the secret detection system 100. The system 100 can be implemented on one or more devices having one or more processors in one or more locations, such as in server computing device 315. User computing device 312 and the server computing device 315 can be communicatively coupled to one or more storage devices 330 over a network 360. The storage device(s) 330 can be a combination of volatile and non-volatile memory, and can be at the same or different physical locations than the computing devices 312, 315. For example, the storage device(s) 330 can include any type of non-transitory computer readable medium capable of storing information, such as a hard-drive, solid state drive, tape drive, optical storage, memory card, ROM, RAM, DVD, CD-ROM, write-capable, and read-only memories. The storage device(s) 330 and the server computing device 315 can be part of the computing platform 101. The computing platform 101 can be configured to perform a number of cloud computing platform services using the devices 315, 330, such as hosting cloud storage for data back-up, or hosting one or more virtual machines accessible by user computing devices in communication with the platform 101.

The server computing device 315 can include one or more processors 313 and memory 314. The memory 314 can store information accessible by the processor(s) 513, including instructions 321 that can be executed by the processor(s) 513. The memory 314 can also include data 323 that can be retrieved, manipulated or stored by the processor(s) 313. The memory 314 can be a type of non-transitory computer readable medium capable of storing information accessible by the processor(s) 313, such as volatile and non-volatile memory. The processor(s) 313 can include one or more central processing units (CPUs), graphic processing units (GPUs), field-programmable gate arrays (FPGAs), and/or application-specific integrated circuits (ASICs), such as tensor processing units (TPUs).

The instructions 321 can include one or more instructions that when executed by the processor(s) 313, cause the one or more processors to perform actions defined by the instructions. The instructions 321 can be stored in object code format for direct processing by the processor(s) 313, or in other formats including interpretable scripts or collections of independent source code modules that are interpreted on demand or compiled in advance. The instructions 321 can include instructions for implementing the system 100 consistent with aspects of this disclosure. The system 100 can be executed using the processor(s) 313, and/or using other processors remotely located from the server computing device 315.

The data 323 can be retrieved, stored, or modified by the processor(s) 313 in accordance with the instructions 321. The data 323 can be stored in computer registers, in a relational or non-relational database as a table having a plurality of different fields and records, or as JSON, YAML, proto, or XML documents. The data 323 can also be formatted in a computer-readable format such as, but not limited to, binary values, ASCII or Unicode. Moreover, the data 323 can include information sufficient to identify relevant information, such as numbers, descriptive text, proprietary codes, pointers, references to data stored in other memories, including other network locations, or information that is used by a function to calculate relevant data.

The user computing device 312 can also be configured similarly to the server computing device 315, with one or more processors 316, memory 317, instructions 318, and data 319. The user computing device 312 can also include a user output 326, and a user input 324. The user input 324 can include any appropriate mechanism or technique for receiving input from a user, such as keyboard, mouse, mechanical actuators, soft actuators, touchscreens, microphones, and sensors.

The server computing device 315 can be configured to transmit data to the user computing device 312, and the user computing device 312 can be configured to display at least a portion of the received data on a display implemented as part of the user output 326. The user output 326 can also be used for displaying an interface between the user computing device 312 and the server computing device 315. The user output 326 can alternatively or additionally include one or more speakers, transducers or other audio outputs, a haptic interface or other tactile feedback that provides non-visual and non-audible information to the platform user of the user computing device 312.

Although FIG. 3 illustrates the processors 313, 316 and the memories 314, 317 as being within the computing devices 315, 312, components described in this specification, including the processors 313, 316 and the memories 314, 317 can include multiple processors and memories that can operate in different physical locations and not within the same computing device. For example, some of the instructions 321, 318 and the data 323, 319 can be stored on a removable SD card and others within a read-only computer chip. Some or all of the instructions and data can be stored in a location physically remote from, yet still accessible by, the processors 313, 316. Similarly, the processors 313, 316 can include a collection of processors that can perform concurrent and/or sequential operation. The computing devices 315, 312 can each include one or more internal clocks providing timing information, which can be used for time measurement for operations and programs run by the computing devices 315, 312.

The server computing device 315 can be configured to receive requests to process data from the user computing device 312. For example, the environment 300 can be part of a computing platform configured to provide a variety of services to users, through various user interfaces and/or APIs exposing the platform services. For example, one or more services can be a machine learning framework or a set of tools for managing software applications programmed to offer a particular service. The user computing device 312 may receive and transmit data related to secrets leaked during the course of managing the software applications.

The devices 312, 315 can be capable of direct and indirect communication over the network 360. The devices 315, 312 can set up listening sockets that may accept an initiating connection for sending and receiving information. The network 360 itself can include various configurations and protocols including the Internet, World Wide Web, intranets, virtual private networks, wide area networks, local networks, and private networks using communication protocols proprietary to one or more companies. The network 360 can support a variety of short- and long-range connections. The short- and long-range connections may be made over different bandwidths, such as 2.402 GHz to 2.480 GHz 2.4 GHz and 5 GHz; or with a variety of communication standards, such as standards for wireless broadband communication. The network 360, in addition or alternatively, can also support wired connections between the devices 312, 315, including over various types of Ethernet connection.

Although a single server computing device 315 and user computing device 312 are shown in FIG. 3, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Example Methods

Figure 4:
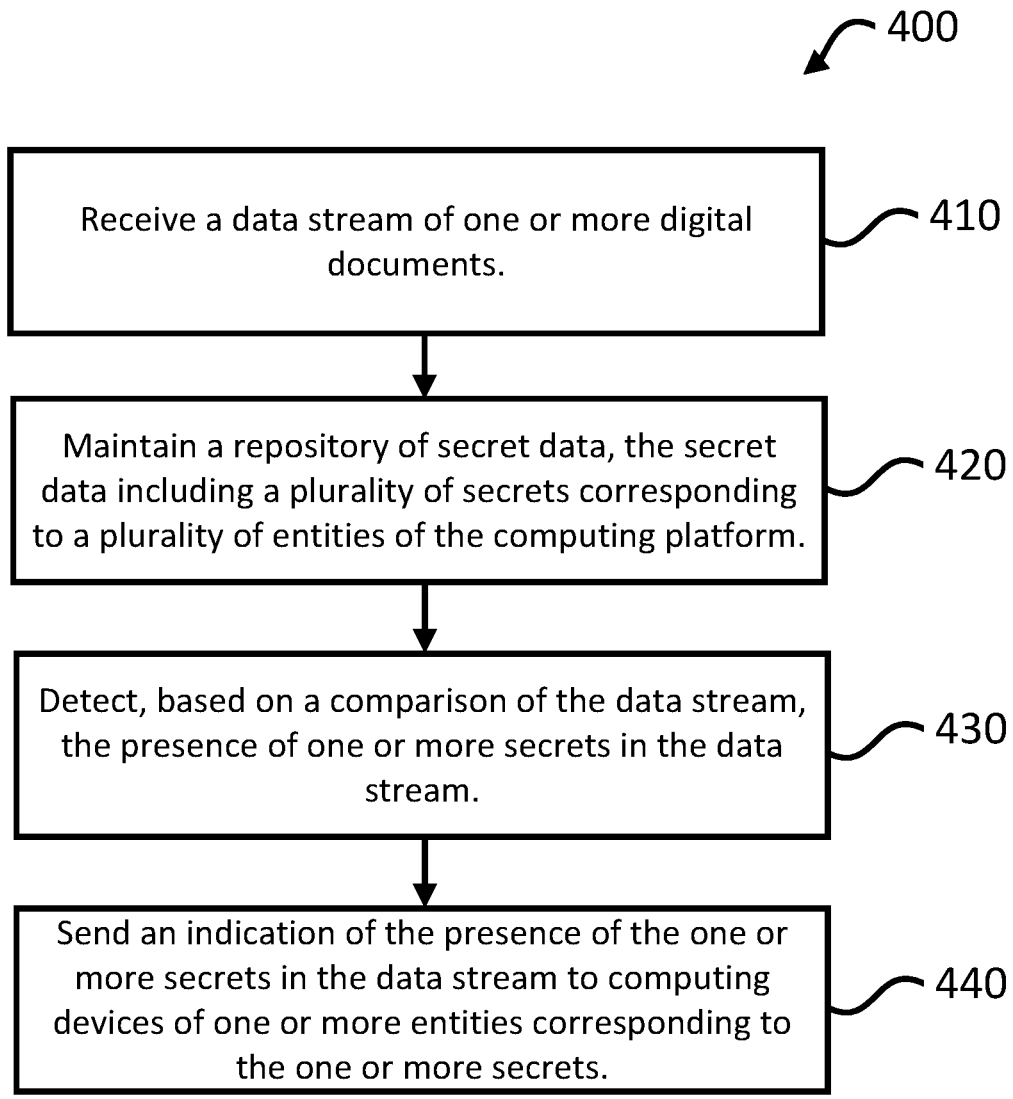
FIG. 4 is a flow chart of an example process for end-to-end secret detection on a computing platform.

FIG. 4 is a flow chart of an example process 400 for end-to-end secret detection on a computing platform. For example, the computing platform can implement a secret detection system, which itself can be one or more computing systems configured to perform the process 400.

A secret detection system receives a data stream of one or more digital documents, according to block 410. For example, the secret detection system receives a data stream of digital documents, which as described herein can include any of a variety of human- or computer-generated documents, both structured and unstructured.

The secret detection system retrieves a collection of data from a repository of secret data, the collection of secret data including a plurality of secrets each associated with one or more entities to one or more entities of the computing platform, according to block 420. The repository of secret data includes known secrets provided to the system by entities in communication with the computing platform. The availability of known secrets provides a deterministic approach for identifying secrets while maintaining the secrets themselves in a secure location. The repository of secret data can be stored on one or more storage devices maintained by a computing platform, for example. In other examples, the repository of secret data can be retrieved from remote storage devices not part of a computing platform implementing the secret detection system, but in communication with the secret detection system.

The secret detection system detects, based on a comparison of the data stream, one or more secrets in the data stream, according to block 430. As part of detecting the one or more secrets, the secret detection system can perform at least a portion of the process 500, described herein with reference to FIG. 5. Because the known secrets are available to the secret detection system, secret detection can be performed deterministically, which is generally more accurate than statistical approaches in which the presence of secrets in a document are predicted, for example based on similar string patterns or other indicators.

Further, the secret detection system not only determines that a secret was leaked, but also from which group or subgroup the secret was leaked. In other words, the secret detection system can consolidate information about different organizations and subgroups within those organizations operating on the computing platform, with the described secret detection. This consolidation and identification can be done automatically, and without requiring entities of the computing platform to separately maintain information about different potentially related groups that may share secrets or be affected by secret leaks from other related groups.

The secret detection system sends an indication of the presence of the one or more secrets in the data stream to computing devices of one or more entities corresponding to the one or more secrets, according to block 440. The indication can be sent as part of a recommended or automatic course of action. For example, the secret detection system can cause a process to change the leaked secret, such as a password or API token, to mitigate vulnerability caused by the leak. The indication can include different types of information related to the leak, including the affected projects within an organization, the number of occurrences of the leak, the document(s) containing the leak, the origin of the document(s), and the time and location of the leak, based on metadata from the document(s).

Figure 5:
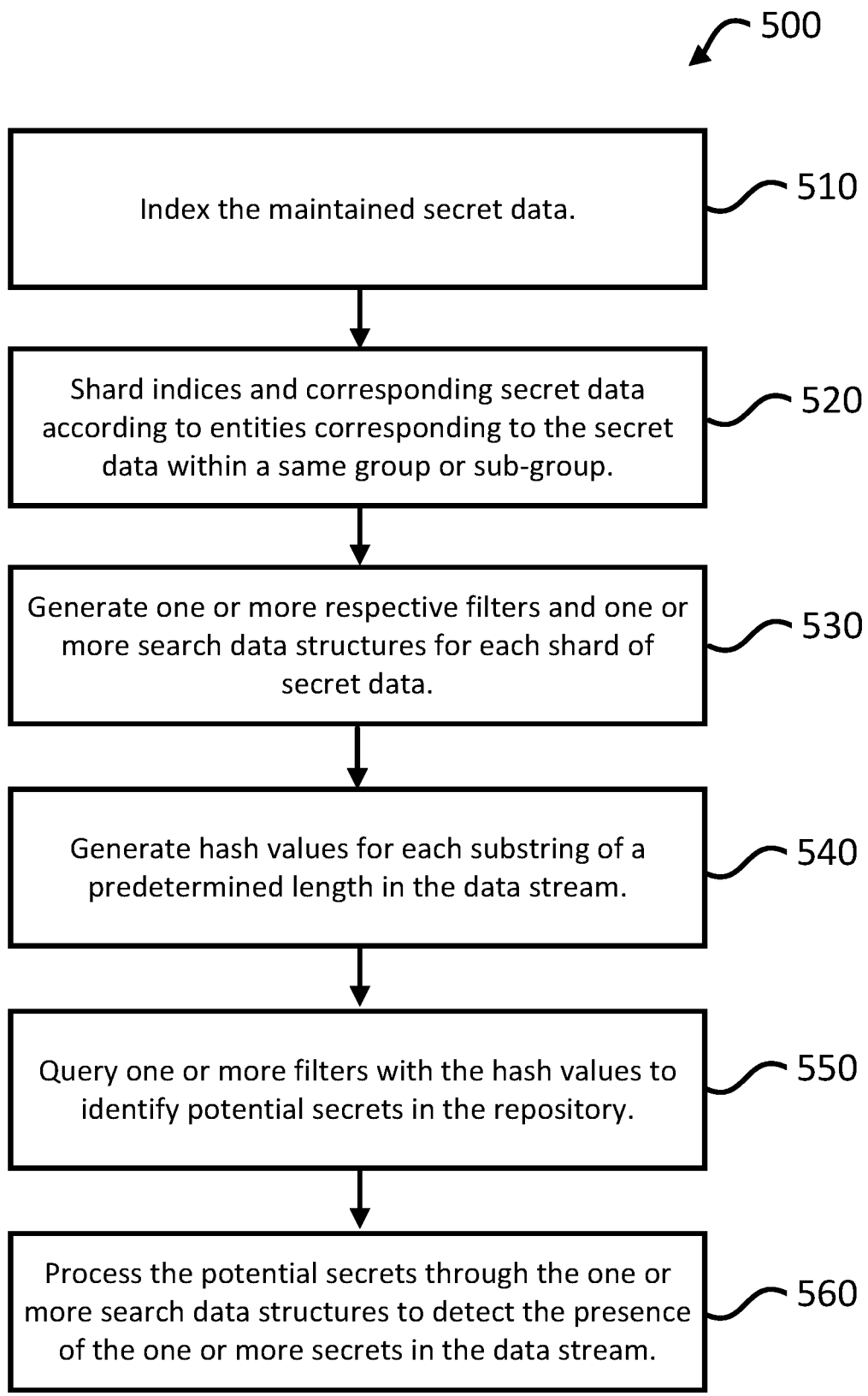
FIG. 5 is a flow chart of an example process for detecting the presence of one or more secrets in a data stream of digital documents.

FIG. 5 is a flow chart of an example process 500 for detecting the one or more secrets in a data stream of digital documents.

A secret detection system indexes maintained secret data, according to block 510. The secret data can be indexed based on the scope indicated in a request to perform secret detection. For example, the scope can be at an organization-level, or within specific projects. The secret detection system can also verify if the source of a request for secret detection has appropriate permissions to make the request. The secret detection system can also verify that an index is already generated and not past its expiration date, and index the maintained secret data if a current index is not available. The system can use any of a variety of different hash functions for generating the indices, including cyclic redundancy checks (CRC), for example, of degree 39.

The secret detection system shards the indices and corresponding secret data according to entities corresponding to the secret data within a same group or subgroup, according to block 520. The indexed secret data is sharded to decrease processing time, by distributing the processing of the shards across multiple processors of the platform. The sharding can occur more than once, and can occur at different points in the process 500. For example, the secret detection system may shard the data stream and indices by organization, and process the per-organization secret data across multiple instances of the document filter engine and matcher engine. Before or after the filtering and matching, the secret detection system can shard a data stream.

In addition, generating corresponding shards for each subgroup of a group to generate filters and/or search data structures can improve performance of the system, for example because filters and/or search data structures for smaller subgroups can be more easily stored in memory than a corresponding data structure or filter for secret data of an organization and be processed in parallel.

In some examples, a shard for an organization can be partitioned into smaller shards, for example by hash prefix of each secret corresponding to the organization when hashed, or by secret data corresponding to different subgroups in the organization, such as projects. In those examples, multiple filters and/or search data structures can be generated by the system for each shard. The system can be configured to evaluate the computational cost, for example measured in processing cycles or memory requirements, to determine whether creating additional shards for the secret data of an organization is more efficient than generating a single set of filters and/or search data structures for the single shard.

The secret detection system generates one or more respective filters and one or more search data structures for each shard of secret data, according to block 530. The filter(s) and search data structure(s) can be generated by the index builder of the secret detection system, as described herein with reference to FIG. 2. The filters and/or the search data structures can be scoped to a particular group of entities within the platform, for example at the organization, project, or folder level.

The secret detection system generates hash values for each substring of a minimum predetermined length in the data stream, according to block 540. The minimum predetermined length can be a predetermined parameter, and adjusted in various examples. An example predetermined length can be 8 characters as a string, or 8 bytes if the data stream is processed in raw bytes.

The secret detection system can scan the data stream substring by substring, beginning at position 0, and incrementing one position at a time, e.g., from character at position 0, to character at position 1, to character at position 2, etc. In examples in which the data stream is a sequence of bytes, the secret detection system can scan byte by byte. The secret detection system can use any of a variety of hash functions, such as any of a variety of rolling hash functions, a Rabin fingerprint, cryptographic hash functions, and/or non-cryptographic hash functions.

The secret detection system queries the filter with the hash values to identify potential secrets in the repository, according to block 550. For each hash value in which the filter returns either a positive or negative indication that the hash value is or is not in the shard used to generate the filter. For positive indications, e.g., that a substring is in the shard according to some predetermined false-positive probability, the system can save the starting position of the hash value in the data stream. The system, after querying each of the hash values, can generate a filtered data stream, with hash values of substrings in which negative indications were returned are removed. In other examples, the system can generate metadata including starting positions for each positively queried hash value. As described herein, a document filter engine can filter a data stream of digital documents to identify leaked secrets using either an exact-match mode or a within-match mode.

The secret detection system processes the potential secrets through the one or more search data structures to detect the presence of the one or more secrets in the data stream, according to block 560. The search data structures can include Aho-Corasick finite state automata built by an index builder of the secret detection system for a shard of the filtered input data stream of digital documents. The potential secrets are filtered from a larger data stream to reduce the computational costs, for example measured in the number of processing cycles, required to search the search data structures to find matches between the potential secrets and known secrets. In some examples as described herein, instead of search data structures, additional filters and a combination of prefix and exact matching can be used.

In some implementations, the secret detection system can be configured to improve other systems on a computing platform configured for predicting the existence or absence of a secret within a data stream of documents. Such a system may not have access to a secret data repository, but can query the secret detection system to verify independent predictions of leaked secrets in a data stream. The system may not have access to the secret data repository for security or design reasons, but nonetheless may provide some form of secret detection that can be applied as a preliminary check. In other examples, user computing devices operated by different entities may or may not have the authorization to access the services of the secret detection system, but may have authorization to access the service of this example system generating independent predictions.

For instance, the system may implement a machine learning model, a statistical model and/or pattern matching, such as regular expressions, to predict the presence of a secret in a received data stream. The example system can be trained to recognize patterns of text indicative of secrets, including common password strings or text formatted as a secret API key. The example system can generate a prediction according to some confidence score. The confidence score can correspond to how likely the flagged substring of the stream is considered to be a secret, based on the example system's prediction.

After generating the prediction and confidence score, the example system may query the secret detection system to confirm whether the flagged substring is actually a secret. Based on the response of the secret detection system, the example system as described herein can adjust its confidence score for future predictions of strings with similar patterns. For example, the example system can raise its confidence score if the secret detection system confirmed that the flagged substring is a leaked secret, and lower its confidence score otherwise.

The example system in response to receiving a confirmation that a secret has been detected can proceed to prompt the requesting user computing device of the detection, and provide one or more options for addressing the security vulnerability, such as beginning a password change process or API token refresh.

Aspects of the disclosure provide for improvements in the accuracy of secret detection systems that do not have direct access to a secret data repository. The example system predicting the presence of secrets with a confidence score can be improved in accuracy by periodically querying the secret detection system to confirm its own predictions, without granting access directly to the sensitive secret data repository.

Aspects of this disclosure can be implemented in digital circuits, computer-readable storage media, as one or more computer programs, or a combination of one or more of the foregoing. The computer-readable storage media can be non-transitory, for example, as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A computing platform comprising:
one or more hardware processors configured to control operations to:
receive a data stream of one or more digital documents;
retrieve a collection of secret data in a repository, the secret data comprising a plurality of secrets, wherein each secret in the plurality of secrets is associated with one or more entities in communication with one or more computing systems;
detect, based on a comparison of the data stream with the secret data, one or more secrets in the data stream; and
in response to the detection, send an indication of the presence of the detected secrets to the one or more entities associated with the detected secrets,
wherein the data stream and the plurality of secrets are encoded as strings;
wherein in detecting the presence of the one or more secrets, the one or more hardware processors are further configured to control operations to:
index the plurality of secrets in the repository,
identify one or more potential secrets in the data stream based on predetermined false-positive probabilities that the one or more potential secrets are in the repository, and
identify the one or more secrets from the one or more potential secrets in the data stream;
wherein in indexing the secret data, the one or more hardware processors are further configured to control an operation to generate one or more filters, the one or more filters indicating the existence or absence of secrets in the secret data with non-zero probability; and
wherein in detecting the presence of the one or more secrets in the data stream, the one or more hardware processors are configured to control operations to:
generate hash values for each substring of a minimum predetermined length in the data stream;
query the hash values through the one or more filters to identify potential secrets in the repository with non-zero probability to generate a filtered data stream; and
process the potential secrets through one or more search data structures comprising secrets in the repository to detect the presence of the one or more secrets in the data stream.

2. The computing platform of claim 1, wherein in retrieving the collection of secret data in the repository the one or more hardware processors are configured to control operations to receive and update the repository with additional secrets received by one or more computing devices associated with the one or more entities.

3. The computing platform of claim 1,
wherein in indexing the secret data, the one or more hardware processors are configured to control an operation to generate a respective hash value of a prefix of each secret in the secret data, the length of the prefix equal to the minimum predetermined length; and
wherein in querying the hash values through the one or more filters to identify the potential secrets, the one or more hardware processors are configured to control an operation to, in response to identifying a potential secret with a hash value matching a substring of the data stream, identify each secret with the same hash value as a potential secret.

4. The computing platform of claim 1,
wherein the one or more hardware processors are configured to control operations to:
maintain data corresponding to groups of entities within the one or more entities, each group comprising zero or more subgroups and organized according to a hierarchy,
shard the data stream according to digital documents associated with same groups or subgroups; and
generate a respective search data structure corresponding to secret data for each entity in a respective group.

5. The computing platform of claim 4, wherein each of the one or more filters represents the existence or absence of secrets in the shard with non-zero probability.

6. The computing platform of claim 4, wherein in processing the potential secrets, the one or more hardware processors are configured to control an operation to:
process, through each search data structure, respective potential secrets corresponding to entities within the same group or subgroup corresponding to a respective shard.

7. The computing platform of claim 4, wherein in sending an indication of the presence of the one or more secrets to one or more computing devices, the one or more hardware processors are configured to control an operation to send the indication to at least one computing device of an entity within a first subgroup different than a second subgroup of the one or more entities, the first subgroup and the second subgroup within a same group according to a hierarchical arrangement.

8. The computing platform of claim 4, wherein each search data structure is a respective Aho-Corasick finite state automaton.

9. The computing platform of claim 4, wherein each filter is a respective Bloom filter.

10. The computing platform of claim 4, wherein the one or more computing devices are associated with the same group or subgroups of the one or more secrets and are authorized based on the association with the same group or subgroups receive the indication.

11. The computing platform of claim 1, wherein in sharding the data stream, the one or more hardware processors are configured to control operations to:
shard the data stream according to digital documents belonging to a first group comprising one or more subgroups, before querying the hash values through the one or more filters, each filter corresponding to secrets for the first group; and
shard the filtered data stream according to digital documents belonging to the one or more subgroups of the first group, before processing the potential secrets through the one or more search data structures, wherein the one or more search data structures correspond to secret data for one of the one or more or more subgroups.

12. The computing platform of claim 1, wherein the one or more hardware processors are further configured to control an operation to cause the detected secrets to be deleted or updated.

13. A computer-implemented method, comprising:
receiving a data stream of one or more digital documents;
retrieving a collection of secret data in a repository, the secret data comprising a plurality of secrets, wherein each secret in the plurality of secrets is associated with one or more entities in communication with one or more computing systems;
detecting, based on a comparison of the data stream with the secret data, one or more secrets in the data stream; and
in response to the detection, sending an indication of the presence of the detected secrets to the one or more entities associated with the detected secrets,
wherein the data stream and the plurality of secrets are encoded as strings;
wherein detecting the presence of the one or more secrets further comprises:
indexing the plurality of secrets in the repository,
identifying one or more potential secrets in the data stream based on predetermined false-positive probabilities that the one or more potential secrets are in the repository, and
identifying the one or more secrets from the one or more potential secrets in the data stream;
wherein indexing the secret data comprises generating one or more filters, the one or more filters indicating the existence or absence of secrets in the secret data with non-zero probability; and
wherein detecting the presence of the one or more secrets in the data stream comprises:
generating hash values for each substring of a minimum predetermined length in the data stream;
querying the hash values through the one or more filters to identify potential secrets in the repository with non-zero probability to generate a filtered data stream; and
processing the potential secrets through one or more search data structures comprising secrets in the repository to detect the presence of the one or more secrets in the data stream.

14. The method of claim 13, wherein retrieving the collection of secret data in the repository comprises receiving and updating the repository with additional secrets received by one or more computing devices associated with the one or more entities.

15. The method of claim 13,
wherein indexing the secret data comprises generating a respective hash value of a prefix of each secret in the secret data, the length of the prefix equal to the minimum predetermined length; and
wherein querying the hash values through the one or more filters to identify the potential secrets comprises, in response to identifying a potential secret with a hash value matching a substring of the data stream, identifying each secret with the same hash value as a potential secret.

* * * * *